Dec. 3, 1940.  A. H. McKEAG  2,223,425
LUMINESCENT MATERIAL
Filed Oct. 19, 1938
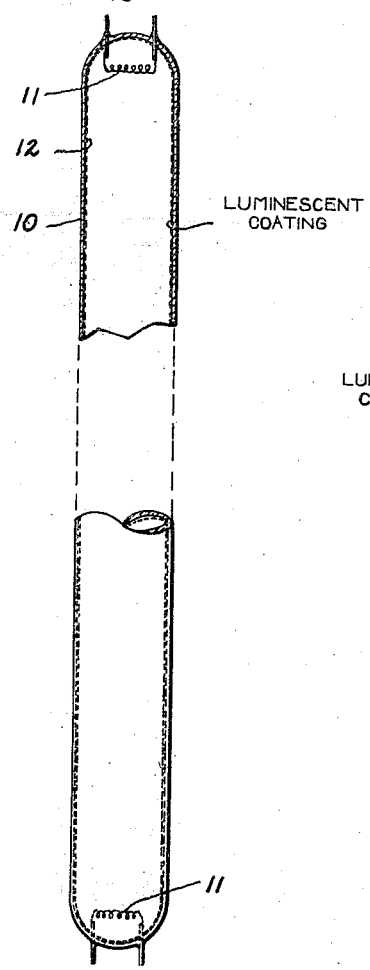
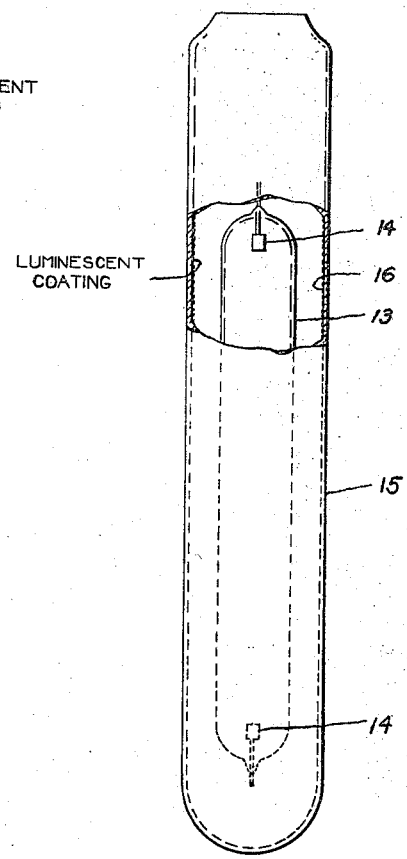
Inventor:
Alfred H. McKeag,
by Harry E. Dunham
His Attorney.

Patented Dec. 3, 1940

2,223,425

UNITED STATES PATENT OFFICE 2,223,425

LUMINESCENT MATERIAL

Alfred Hamilton McKeag, Wembley, England, assignor to General Electric Company, a corporation of New York Application October 19, 1938, Serial No. 235,914
In Great Britain October 20, 1937

5 Claims. (Cl. 250—81)

This invention relates to sources of light of the type comprising an envelope containing a gaseous medium through which an electric discharge is adapted to pass so that the spectrum of at least one component of the said medium is emitted, and luminescent material adapted to be excited by the said discharge. It is to be observed that no source in which luminescent material is excited solely by cathode rays or X-rays is of this type. The luminescent material may be within the envelope or outside it and excited by radiation transmitted by it.

In British patent specification No. 469,732 the use of magnesium tungstate in a source of this type, is described, the discharge being low pressure mercury discharge or a neon discharge. In British application No. 13,669 the use of the same material is described, the discharge being a high-pressure mercury-vapor discharge. It is also known that cadmium tungstate can be excited to luminescence by cathode rays, but I am not aware that it has ever been used in commercial sources of the type specified.

I have now discovered that magnesium cadmium tungstate, that is to say, a solid solution of magnesium and cadmium tungstates containing a substantial proportion of each constituent, is a luminescent material having certain advantages over both magnesium tungstate and cadmium tungstate, and, in particular, a greater luminescent efficiency.

When it is said, hereinbefore and hereinafter, that a compound or a solid solution is a luminescent material, the statement must be interpreted with regard to known facts and conventions. The luminescent properties always depend on the physical state of the material, determined by its method of preparation and on the presence or absence of certain substances contained in it. What is really meant is that, if the compound or solid solution is suitably prepared, possibly with the addition of small proportion(s) of activator(s) and with the exclusion of certain inhibitors, then it will be luminescent under suitable excitation. Further, materials that are luminescent in this sense can be mixed with other materials, either luminescent or non-luminescent, without losing their identity. This possibility is suitably implied by the statement that a luminescent material is or comprises the chemical compound or solid solution X.

According to the invention, in a source of light of the type specified the said luminescent material is or comprises luminescent magnesium cadmium tungstate. The constituents other than the said tungstate may be, in known manner, other luminescent materials giving luminescent light of other colors; the amount of such other luminescent material may even exceed that of the magnesium cadmium tungstate; or it may be, as explained below, a substance whose presence promotes the efficiency of the said tungstate.

When excited by mercury radiation, magnesium cadmium tungstate yields luminescent light whose dominant hue is of somewhat (but not very much) longer wave length than that of the light from magnesium tungstate similarly excited.

Most of the change in the dominant hue occurs when 5 per cent of cadmium oxide is present; larger quantities may be added, but the further change that they produce is relatively small. No advantage is known in making the molecular proportion of the cadmium tungstate exceed that of the magnesium tungstate.

Luminescent magnesium cadmium tungstate can be prepared by substituting the necessary amount of cadmium for magnesium in any of the known processes by which luminescent tungstates are prepared. The solid solution will be formed during the heat treatment that is a necessary part of the process, whether the starting materials are the solid oxides or solutions of magnesium and cadmium salts and of a soluble tungstate. The addition of a small amount of lead, as described in said British patent specification No. 469,732, is permissible, but appears not to be strictly necessary.

Magnesium cadmium tungstate is white when pure, at least if the molecular proportion of the magnesium tungstate exceeds that of the cadmium tungstate. But is is liable to be discolored and thereby to lose efficiency, probably by the absorption of the primary exciting radiation and/or of the secondary light. If the material is prepared by heating the oxides of magnesium, cadmium and tungsten, it may be discolored immediately after preparation, unless special precautions are taken. But a more serious source of discoloration is the heating of the material when it has been coated on the envelope of the discharge device and this envelope is baked in the normal course during the evacuation of the envelope. The coloration is bluish and is probably due to the production of suboxide of tungsten by reduction of the residual gases.

It has been found that discoloration of either of these kinds can be prevented by mixing intimately with the tungstate excess of basic oxide.

A suitable amount of excess oxide is about 0.1 mol. MgO per mol. (WO₃) in the tungstate. The presence of the excess oxide may lead to some loss of luminescent efficiency, due to mere dilution; but unless unnecessarily large amounts of excess oxide are used, any loss due to this cause is more than offset by the prevention of discoloration.

Since CdO is colored, the excess oxide should be MgO rather than CdO. But it is to be observed that, if a large excess of MgO were introduced into the starting materials before the tungstate is formed, the excess of oxide after the formation would not necessarily consist of MgO. It has therefore been found preferable either to introduce some at least of the excess MgO after the formation of the mixed tungstate, or to start with pure magnesium tungstate and to introduce the excess oxide as cadmium oxide, which will replace some of the magnesium oxide in the tungstate and leave it as excess.

Two methods of preparing a suitable magnesium cadmium tungstate, containing basic oxide in excess, will now be described by way of example.

In the first a mixture of 1 mol. CdO to 2 mols. WO₃ is heated to 1000° C. for one hour in an oxidizing atmosphere. The resulting material is generally dark or colored. It is ground and mixed with 1.1 mol. MgO; the mixture is heated to 1150° C. for one hour, or possibly longer if all coloration is not absent at the end of that period. The amount of excess oxide is now only 0.05 per cent mol. per mol. of WO₃. Accordingly the product is ground with 0.1 mol. MgO so as to be mixed intimately with it. The mixture is not subsequently heated to any temperature approaching 1000° C.; the added MgO has therefore no opportunity of replacing the CdO, but remains as excess MgO.

In an alternative method of preparing the material, there is added to magnesium tungstate, prepared by the method described in British patent specification No. 469,732 from an equimolecular mixture of MgO and WO₃, 0.1 mol. of cadmium oxide in the form of a solution of either cadmium nitrate or cadmium sulphate. The mixture is dried at 200° C., reground and heated in air at 1150° C. for one hour.

The discharge in a source according to the invention may be a low-pressure mercury discharge; the luminescent material is then preferably within the envelope. The electrodes may be cold or thermionic. The discharge may also be a high-pressure mercury-vapor discharge; the luminescent material must then be outside the envelope and much cooler than the envelope, which must be of quartz or like material much more transparent to ultra-violet light than ordinary glass. In either of these cases the magnesium cadmium tungstate may be associated with zinc beryllium silicate, or the chlorophosphate described in British patent specification No. 495,706 which provide red luminescent light in which the mercury spectrum is deficient. The discharge may also be through neon, or a mixture of neon with a small amount of heavier rare gases, in substitution for calcium tungstate, as described in British patent specifications Nos. 457,486 or 476,240; the luminescent material must then be within the envelope.

For the purpose of illustrating my invention, I have shown in the accompanying drawing two species thereof, in which Fig. 1 is an elevation, partly in section, of a low pressure lamp, and Fig. 2 is a similar view of a high pressure, high intensity type of mercury vapor lamp.

Referring to Fig. 1, the lamp comprises a sealed tubular envelope 10 of glass with an electrode 11 sealed into each end thereof. As shown, these electrodes are thermionic cathodes of the activated type which may be heated to emission by the passage of current therethrough or by the discharge, but it is to be understood that any other suitable type of electrode may be substituted therefor, and that any of the well-known "cold" cathodes may be employed. The envelope may contain a low pressure of a suitable inert gas, such as argon, together with a small quantity of mercury, or the envelope may contain neon or a mixture of neon with a small amount of heavier rare gases. A coating 12 of my novel magnesium cadmium tungstate is provided on the inner surface of the envelope 10 in any suitable manner, many methods of providing such a coating being now well known.

When the device is energized to produce a discharge between the electrodes 11, the magnesium cadmium tungstate is excited to luminescence by the ultra-violet radiations emitted by the discharge.

In the device of Fig. 2, the discharge envelope 13 is of quartz or other ultra-violet transmitting material and has sealed therein a pair of electrodes 14 of the activated self-heating thermionic type. This envelope preferably contains a rare gas such as argon at a pressure of a few millimeters, together with a quantity of mercury which is usually designed to be wholly evaporated when the lamp reaches operating temperature, the pressure then being ordinarily of the order of an atmosphere or more. An enclosing jacket 15 of glass surrounds the envelope 13 and may be evacuated or filled with an inert gas like nitrogen. A coating 16 of my novel magnesium cadmium tungstate is provided on the inside of this jacket. The discharge within the envelope 13 causes this coating to be excited to emit its characteristic luminescent light which complements the visible light from the discharge.

What I claim as new and desire to secure by Letters Patent of the United States is:

1. A new luminescent material comprising a magnesium cadmium tungstate.

2. A new luminescent material comprising a magnesium cadmium tungstate containing an excess of one of the component basic oxides.

3. A new luminescent material comprising a magnesium cadmium tungstate containing an excess of magnesium oxide.

4. A new luminescent material comprising a magnesium cadmium tungstate containing an excess of about 0.1 mol. of magnesium oxide per mol. of tungstic oxide.

5. A new luminescent material comprising a magnesium cadmium tungstate containing about 5 per cent of cadmium oxide.

ALFRED HAMILTON McKEAG.